T. Sim,
Preserving Meat.
Nº 85,184.   Patented Dec. 22, 1868.

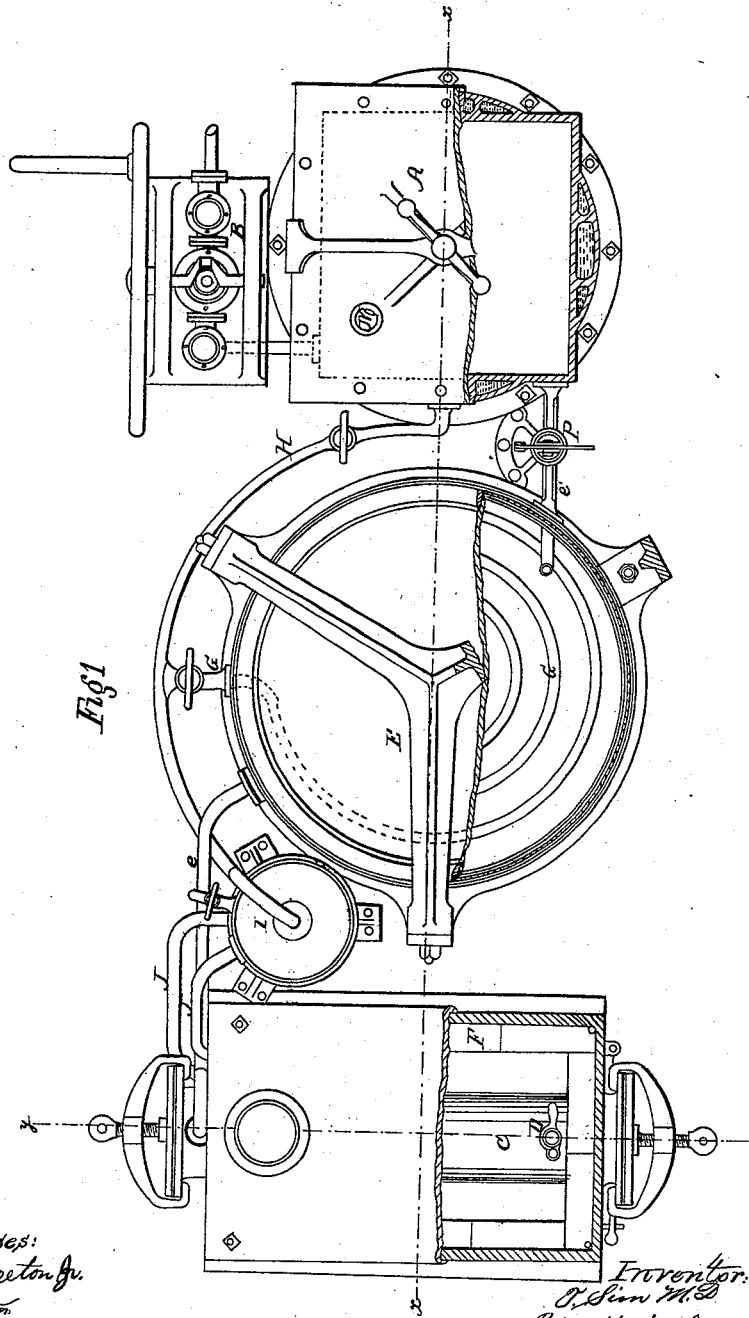

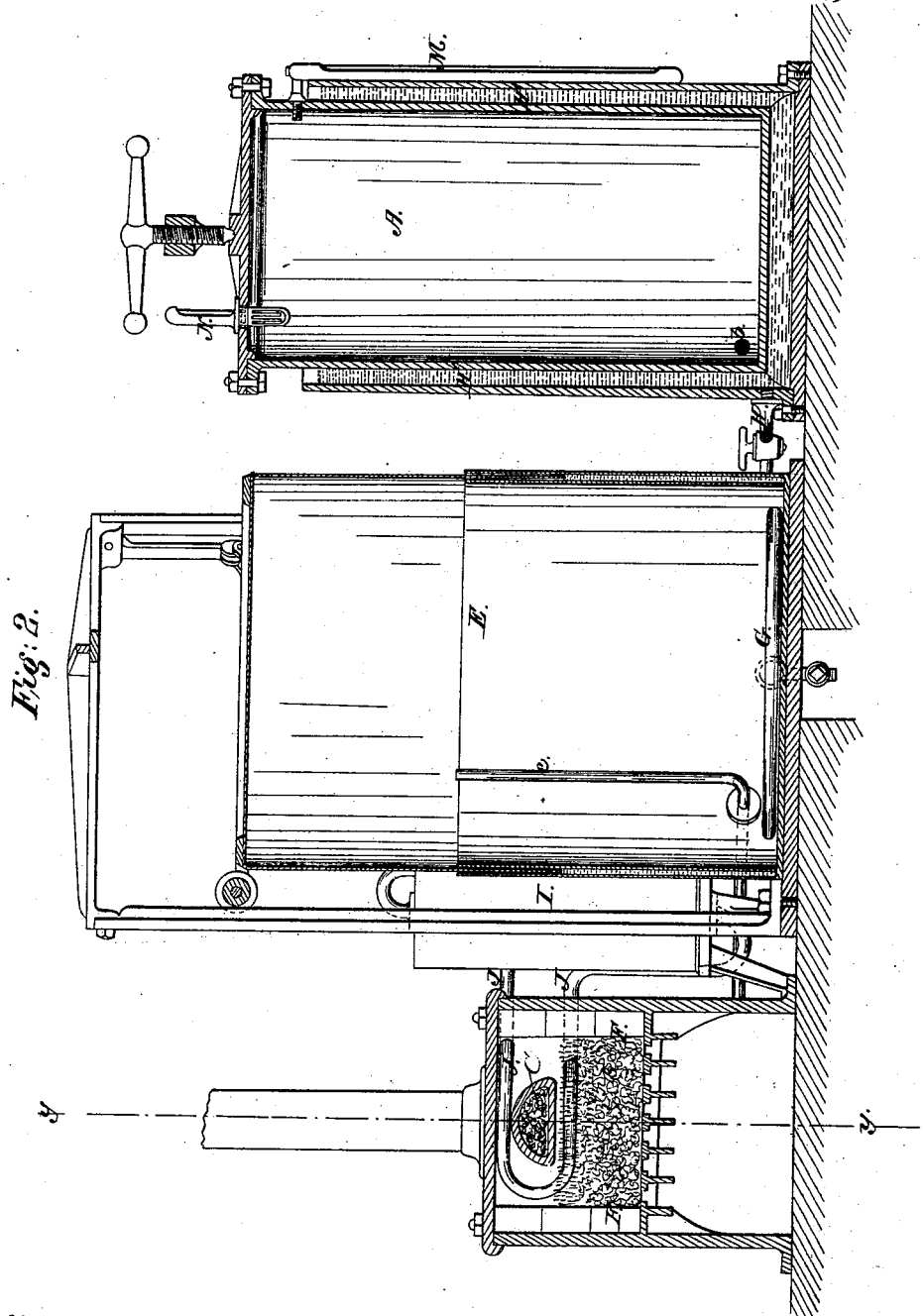

Witnesses
Wm H Brereton Jr.
Jno S Slater

Inventor
T. Sim M.D.
By Knight Bro atty

UNITED STATES PATENT OFFICE.

THOMAS SIM, OF CHARLESTON, SOUTH CAROLINA.

IMPROVED PROCESS AND APPARATUS FOR PRESERVING MEAT AND OTHER PERISHABLE ARTICLES.

Specification forming part of Letters Patent No. 85,184, dated December 22, 1868.

*To all whom it may concern:*

Be it known that I, THOMAS SIM, of Charleston, in the State of South Carolina, doctor of medicine, have invented a certain new and useful Process for Preserving Meat or Animal Bodies, and an apparatus to be used in carrying the said process into effect; and I hereby declare that the following is a sufficiently full and clear description to enable one skilled in the science and art to which my invention appertains to use it, reference being had to the accompanying illustrative drawings, which form a part of this specification, and which represent one form in which the apparatus may be made.

My invention consists, first, in the employment or use of any of the sulphides of carbon—such, for instance, as bisulphide of carbon, protosulphide of carbon, or carbonylic sulphide—applied in gaseous form to meat or animal matter from which air has been partially or entirely removed, so that the said gas will be caused to permeate the meat or animal body to be preserved for the purpose named; second, in the use, in combination with any of the sulphides of carbon, of any suitable product of the destructive distillation of wood or coal; third, in a novel apparatus for carrying this operation into effect.

It is intended to apply this invention to the preserving of animal food of all kinds, as well as fish and fish-waste for the manufacture of fertilizers, or any animal matter which it may be desired to keep fresh.

Figure 4:
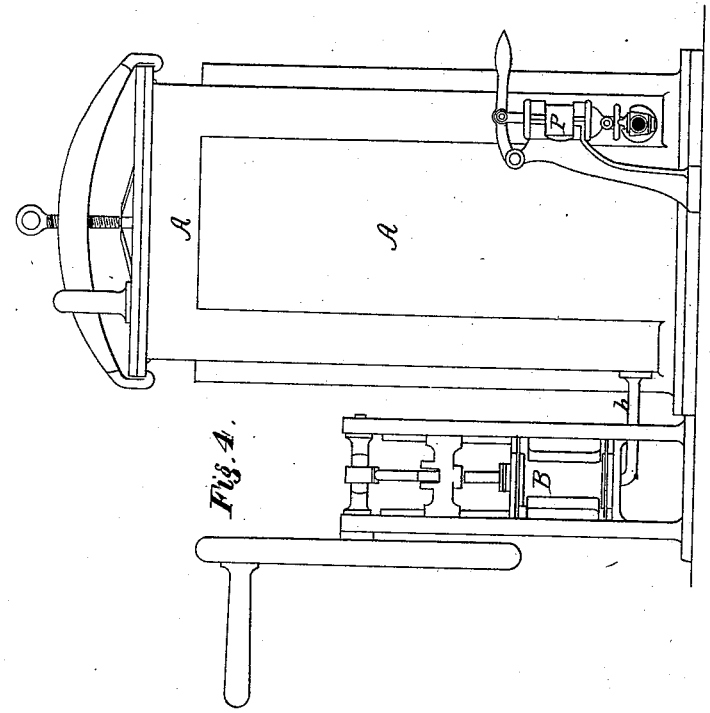
Figure 3:
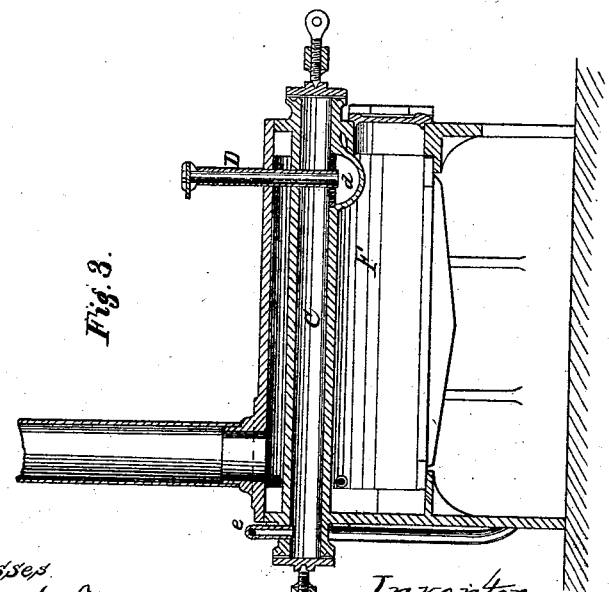

In the drawings, Figure 1 is a plan view, partly in horizontal section, of my apparatus under one of the various forms in which it may be made. Fig. 2 represents a vertical section thereof in the plane indicated by the line $x\ x$ in Fig. 1. Fig. 3 represents a vertical section in the plane indicated by the lines $y\ y$, Figs. 1 and 2. Fig. 4 represents an elevation of the vat and its accessories hereinafter described.

The meat which is to be preserved, either in whole carcasses or in parts, is suspended from hooks within a vat or receiver, A, from which the air is then exhausted, as completely as practicable, through a pipe, $b$, by an air-pump, B, or other means. The vat A is then rapidly filled with gaseous bisulphide of carbon, protosulphide of carbon, carbonylic sulphide, or some equivalent gas, either with or without phenic acid, methyl, or other product of the destructive distillation of wood or coal.

The sulphides of carbon may be produced by any of the well-known methods. Under the present illustration, I employ for this purpose a retort, C, which is charged with charcoal and heated to redness. Sulphur is then introduced through the pipe D, conducting down to a well, $d$, in which the sulphur is burned. The sulphur vapor passing through or in contact with the incandescent charcoal is converted into bisulphide of carbon according to the well-known process. This gas is conducted through a pipe, $e$, into a gas-holder, E, of common construction, the lower part of which is, in the first instance, filled with water for the purpose of excluding air, the said water being afterward drawn off and replaced by the gas.

At the time of introducing the gas into the exhausted receiver, both the gas and the receiver or vat should have a temperature of from 90° to 120° Fahrenheit, (averaging 104°;) and, to guard against the danger of cooling the meat to an injurious extent by the expansion *in vacuo* of the gas within the vat, I provide a supply of gas equal to about double the capacity of the vat, and admit it to the latter instantaneously, applying pressure by means of a suitable pump, P, in the gas-supply pipe $e'$, to make the influx of gas more rapid, and by continued pressure the curing process may be hastened.

The gas-holder and the vat can be heated by hot water circulated through pipes G H connecting with a reservoir, I, from which the water passes to and through the furnace F, and back to the reservoir through the pipe or pipes J J. Chambers H' around the vat A receive the hot water from the pipe H, for the purpose of heating the interior of the vat. M represents a barometer, to indicate the extent of the vacuum within the vat A. N is a thermometer, to indicate the temperature.

The methyl or other vapor may be applied by placing an open vessel of suitable liquid within the vat A.

The great distinction between my process and others, by which it is attempted to preserve meat by chemical agents, is that by the use of the sulphides of carbon I effect a complete dialysation of the gases contained within the meat, which, of course, would produce putrefaction.

The application of the sulphides in gaseous form, while it effects the dialysation of deleterious matters, does not remove or injure any portion of the meat which it is desired to preserve, and when the process is completed no sulphide remains within the meat, but it is all either driven off or changed by dialysation.

Meat treated by my process is permanently preserved from decomposition, and is not materially affected by atmospheric changes. In this respect the effect of my process is much more lasting than others in which carbonic oxide or sulphurous acid is employed.

I do not claim the use of carbonic acid, phenic acid, carbonic oxide, oxide of ethyl, methyl, and the like, as these have been used. These may, however, be used in combination with the sulphides of carbon, and such combinations may constitute a part of my invention.

The following is what I claim as new and desire to secure by Letters Patent:

1. The employment or use, for preserving meat or animal matter, of any of the sulphides of carbon applied in gaseous form and made to permeate the matter to be preserved, after the latter has been exhausted, or partially exhausted, of air.

2. The use, in connection with any of the sulphides of carbon, of phenic acid, methyl, or other product of the destructive distillation of wood or coal.

3. The apparatus, constructed and arranged to operate substantially as herein described.

THOS. SIM.

Witnesses:
WM. H. BRERETON, Jr.,
W. B. DEMING.